Oct. 21, 1969 M. R. HUTCHINS 3,473,354

LOCKING DEVICE

Filed May 31, 1968 6 Sheets-Sheet 1

INVENTOR.
MARLYN R. HUTCHINS

BY Schroeder, Siegfried & Ryan
ATTORNEYS

Oct. 21, 1969 M. R. HUTCHINS 3,473,354

LOCKING DEVICE

Filed May 31, 1968 6 Sheets-Sheet 2

INVENTOR.
MARLYN R. HUTCHINS
BY Schroeder, Siegfried & Ryan
ATTORNEYS

Oct. 21, 1969 M. R. HUTCHINS 3,473,354

LOCKING DEVICE

Filed May 31, 1968 6 Sheets-Sheet 3

INVENTOR.
MARLYN R. HUTCHINS
BY Schroeder, Siegfried & Ryan
ATTORNEYS

Oct. 21, 1969 M. R. HUTCHINS 3,473,354

LOCKING DEVICE

Filed May 31, 1968 6 Sheets-Sheet 4

INVENTOR.
MARLYN R. HUTCHINS

BY Schroeder, Siegfried & Ryan
ATTORNEYS

LOCKING DEVICE

INVENTOR.
MARLYN R. HUTCHINS
BY Schroeder, Siegfried & Ryan
ATTORNEYS

INVENTOR.
MARLYN R. HUTCHINS
BY Schroeder, Siegfried & Ryan
ATTORNEYS 3,473,354
Patented Oct. 21, 1969

3,473,354

LOCKING DEVICE

Marlyn R. Hutchins, Minneapolis, Minn., assignor to Raven Industries, Inc., Sioux Falls, S. Dak., a corporation of South Dakota Filed May 31, 1968, Ser. No. 733,357
Int. Cl. E05b *15/16, 63/00, 37/00*
U.S. Cl. 70—312 15 Claims

ABSTRACT OF THE DISCLOSURE

This invention relates to the field of locking devices and more particularly relates to improvements in the closure member or locking cover for a coin box used with coin-operated appliances.

The disclosure is directed to an improved locking mechanism used with coin boxes on such devices as automatic washing machines where the emphasis is on a construction that cannot be pried open or burglarized. Four tumbler discs are rotatably secured to a plate forming the closure to the coin box in a recessed manner so that they cannot be pulled or pried from the plate. The actuating part of the locking structure is connected to the driven portion of the locking structure through spring-biased couplings. The spring-biased couplings slip when the torque which is applied to the actuating part exceeds a predetermined limit, thus protecting the tumbler discs. The locking structure is also mounted flush or recessed with respect to the face of the plate forming the closure to the coin box to prevent further destruction of the coin box. The tumbler discs are indexed by forming notches in the edge of a retaining circular flange secured to the discs in the plate or by forming notches in the recess which contains the flange. Several variations are shown and described, one of which retain the external knobs for controlling the movement of the discs, making use of an improved indexing mechanism using a small steel ball, and another of which uses a member to lock the tumbler discs while the combination is changed.

This application is directed to an improvement upon a locking device and relates to my co-pending application filed Nov. 23, 1966, under Ser. No. 596,489, entitled "Locking Cover for a Coin Box" and assigned to the same assignee. It has been found that where the tumbler discs of the structure have been made of a plastic material such as nylon or a soft metal, that under certain conditions, unscrupulous operators have obtained a tool or key which could be inserted in the lock itself and by applying sufficient torque to the locking mechanism, the pins which engage the teeth of the nylon discs are broken or sheared by a twisting action and the lock is sometimes forced open. It has also been found that under certain conditions, a form of compound jaw plier or similar tool may be locked around one of the knobs used to rotate the tumbler discs, and the knob and shaft may be pulled from the panel forcing the retaining rings out of their position in some cases and thus allowing the tumbler discs to fall free from the locking mechanism. Additionally, where no indexing mechanism is used, it is easier for the unscrupulous operator to detect when the pins of the lock engage the tumbler discs and thus a more convenient means of "picking" the lock is provided. Also on numerous occasions, attempts have been made to physically drive the knobs or shafts through the back of the panel and thus damage the lock so that it may be opened.

In an attempt to improve the locking structure and overcome the various ways of breaking the lock or picking the lock, means have been provided to prevent the locking mechanism from shearing the teeth from the tumbler discs and means have been provided to insure that the tumbler discs cannot be disabled. In addition thereto, means have been found to provide an indexing mechanism which provides a certain amount of "drag" in the operation of the tumbler discs and thus help prevent "picking" of the lock. Additionally a convenient means has been found to change the combination of the lock.

Therefore, it is a general object of the present invention to provide an improved locking mechanism for use with the coin-collection equipment of coin-operated machines.

It is another object of the present invention to provide a locking mechanism for use with a coin box in which a torque of predetermined magnitude produces a slipping action of the locking mechanism.

It is a further object of this invention to provide a plate member which has the tumbler discs secured thereto in a manner lessening the possibility of destruction of the tumbler discs.

It is still a further object of this invention to provide an indexing member secured in a plate member to lessen the possibility of detecting the lock combination.

It is yet another object of the present invention to provide a convenient means for changing the combination of the lock.

These and other objects and advantages of the invention will more fully appear from the following description, made in connection with the accompanying drawings, wherein like reference characters refer to the same or similar parts throughout the several views and in which.

Figure 1:
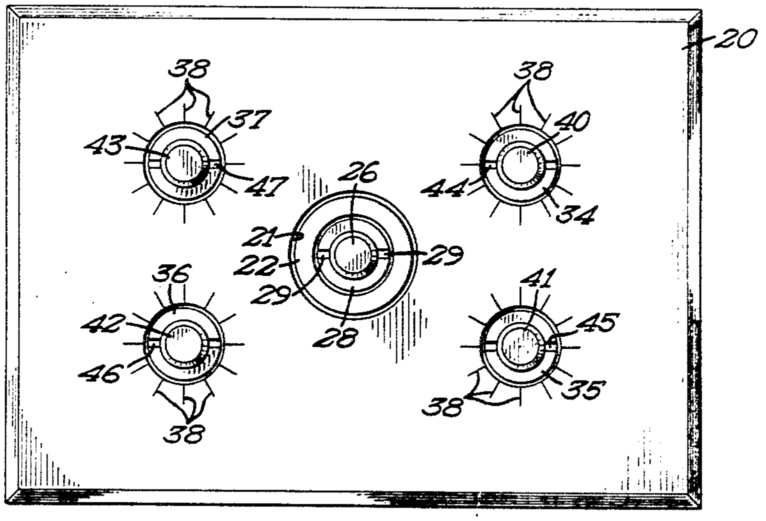
FIG. 1 is an elevation view of the front panel of the locking mechanism.
Figure 3:
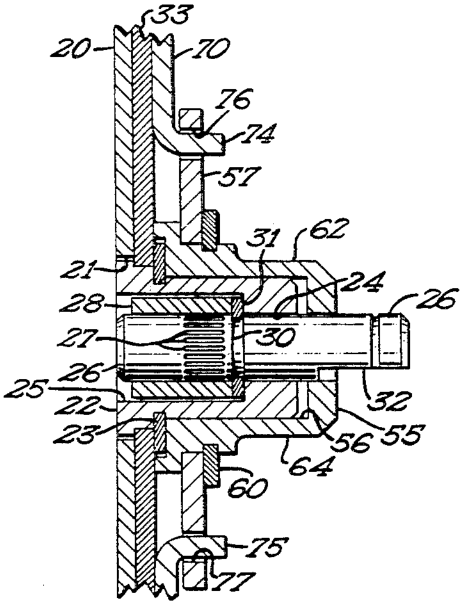
FIG. 3 is a partial section view of the lock-actuating mechanism showing the detail thereof as seen taken along lines 3—3 of FIG. 2.

FIG. 1 discloses a front panel 20 which has a central bore 21 formed therein having a bushing 22 with a flange at the front portion thereof held in flush relationship with the face of panel 20 by appropriate means such as a retaining ring 23 (FIG. 3). Bushing 22 has a pair of concentrically located bores 24 and 25 formed therein with bore 25 having a larger diameter and communicating with bore 24 at the rear thereof, in which a stem member 26 passes therethrough. Stem member 26 has a splined portion 27 to which is secured an outer collar 28 that has a notched portion in the form of a slot 29 formed in the forwardly facing edge thereof. An annular recess 30 is formed in stem 26 adjacent the inner edge of bushing 22 where it mates with bore 24 and another retaining ring 31 is seated in a recess 30 to prevent stem 26 from being driven rearwardly through the lock mechanism. A flat spot 32 is formed on the rear portion of stem 26. Also situated between retaining ring 23 and front panel 20 is another plate 33 which has its edges bent at right angles thereto for receiving other portions of the lock means. Generally, plate 33 is welded to panel 20 to form a unitary structure.

Figure 5:
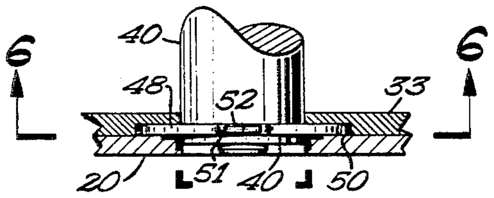
FIG. 5 is a partial section view of the indexing mechanism of the tumbler discs.

Four other bores 24, 35, 36, and 37 are formed about central bore 21 in the face of panel 20 and certain indicia 38 is formed around each of the bores 34 through 37. The indicia may provide any number of radial divisions of a complete circle so as to designate the position of four shaft members 40 through 43 which rotatably reside in bores 34 through 37 respectively. Concentrically formed with each of the shafts 40 through 43 are four slots 44 through 47 respectively formed in the front-facing portion of the shafts. Each of the shafts includes a flange such as a flange 48 (FIG. 5) which is connected to shaft 40, it being understood that the other shafts, slots, and flanges are identical. Flange 48 may be made unitarily with shaft 40 and is seated in an annular groove 50 formed in the cooperating face of plate 33 which joins panel 20.

Flange 48 has a notched portion 51 formed in the outer periphery thereof and has a triangular or oblong-shaped spring member 52 carried in the notch 51. Spring member 52 may be formed from a strip of spring-like material where it is folded and allowed to project into communication with the edge of the wall of annular groove 50. Situated around the edge of annular groove 50 are a plurality of equally spaced indentations 53 which correspond to indicia 38 applied to the front of panel 20. Therefore, as shaft 40 is rotated, it will have a tendency to be retained at one of the positions where spring member 52 engages an indentation 53, thus holding shaft 40 in a position corresponding to one of the positions of the indicia on the front of the panel.

Figure 6:
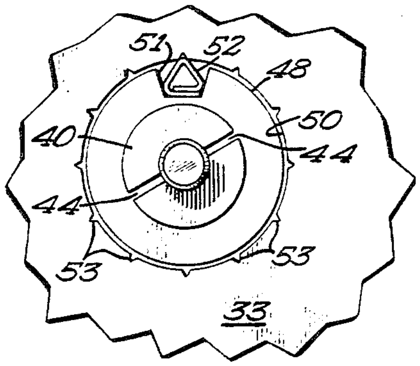
FIG. 6 is a partial elevation section view of the indexing mechanism taken along lines 6—6 of FIG. 5.
Figure 7:
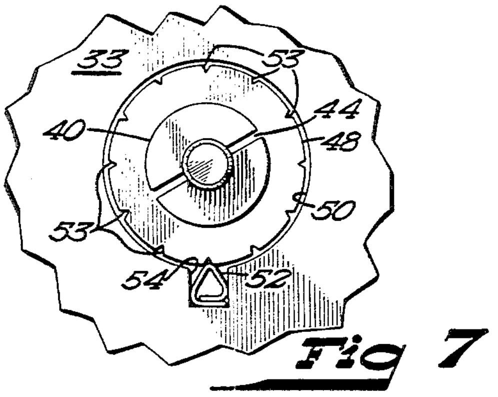
FIG. 7 is a partial elevation section view of an alternative indexing mechanism.

FIG. 7 shows a modification of the structure as found in FIG. 6 where a notch 54 is formed in the edge of annular groove 50 and spring member 52 is situated therein having a tip portion bearing against flange member 48. Indentations 53 are then formed around the outer periphery of flange member 48 to produce the desired result just described. In other words, a number of indentations 53 corresponds to the different radial positions of indicia 38 as found on the front of the panel.

Figure 2:
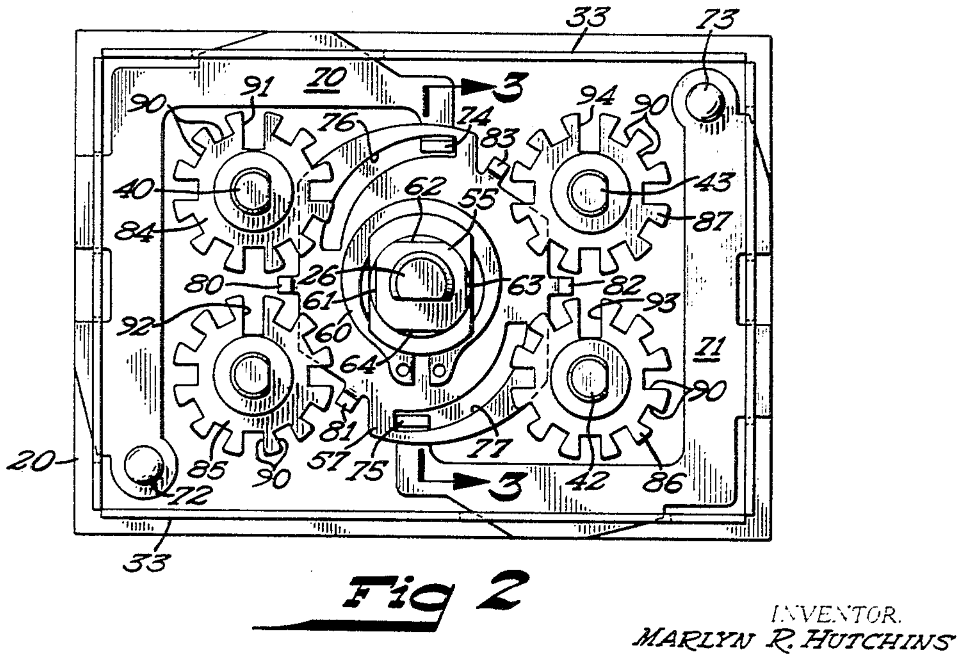
FIG. 2 is an elevation view of the rear panel of the locking mechanism with the spring coupling member omitted.
Figure 4:
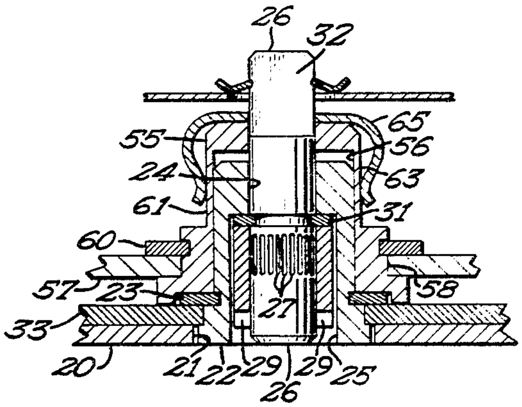
FIG. 4 is a partial section view of the lock actuating mechanism showing the detail of the spring coupling mechanism.
Figure 10:
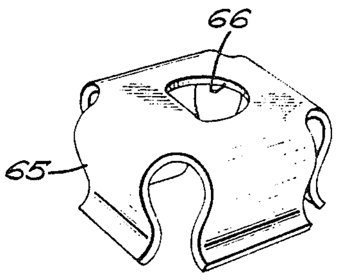
FIG. 10 is an isometric view of the spring coupling mechanism.
Figure 11:
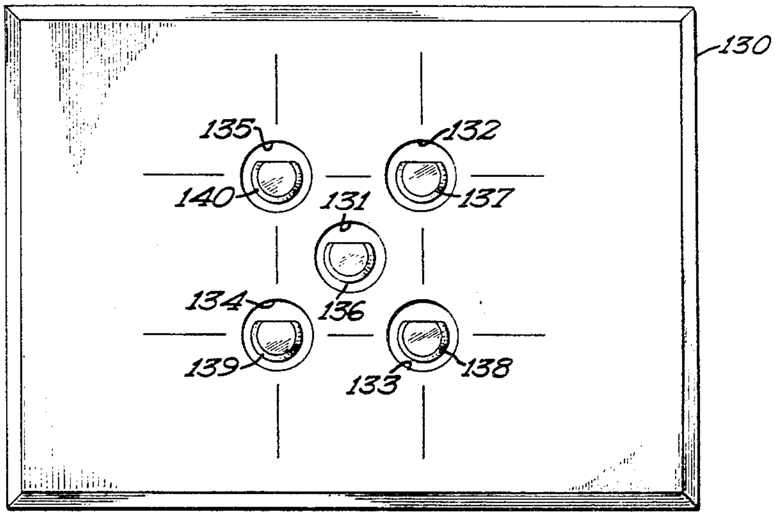
FIG. 11 is an elevation view of the front panel of an alternate locking mechanism.

Turning again to the locking mechanism as shown primarily in FIGS. 2, 3, and 4, it will be found that a hub 55 is fitted over the outer portion of bushing 22 by having a suitable bore 56 formed therein and providing proper clearance for snap ring 23, hub 55 bearing against plate 33. A camming disc 57 is fitted over a shoulder portion of hub 55 forming a keyway 58 and is secured in place against axial movement by a snap ring 60. Hub 55 has four flat spots 61 through 64 formed thereon around the periphery thereof. A coupling means in the form of a spring member 65 (FIG. 10) engages the flat spots on the outer periphery of hub 55. Spring member 65 has a D shaped slot 66 formed therein which cooperates with a flat spot 32 of stem 26. Spring member 65 is formed from spring steel and grips the edges of the flat spots and as will be seen later, resiliently moves to engage and disengage the flat spots as stem 26 is turned.

A pair of substantially right angle arms 70 and 71 lie flat against plate 33 and move parallel with plate 33. The arms are pivoted about a pair of pivot points such as studs 72 and 73. Arms 70 and 71 have upturned portions 74 and 75 respectively which ride in a pair of slots 76 and 77 respectively of camming disc 57. Slots 76 and 77 are spiraled outwardly from the center of camming disc 57 towards the edge thereof. In addition thereto, four upstanding pin portions 80, 81, 82, and 83 are formed from the outer periphery of camming disc 57. As will be shown later, the engaged slots and tumblers which are yet to be described form the locking means.

Shafts 40 through 43 each have a flat spot formed on the rear portions to accommodate a flat spot on the hub of four tumbler discs 84, 85, 86, and 87 respectively. The tumbler discs are secured to the shafts by suitable means such as retaining rings, one type being a "Truarc" self-locking ring, series 5115. Each of the tumbler discs has a plurality of slots 90 formed therein which correspond in number to the number of indicia on the front panel and the slots bear the same angular relationship as the indicia. The slots are formed of random depth and are positioned at random about the tumbler discs. Each of discs 84 through 87 contain an elongated slot 91 through 94 respectively, the slots being deeper than any of the slots described previously which were formed at random depth.

As can readily be seen, pins 80 through 83 are constructed and arranged to engage the slots in tumbler discs 84 through 87 respectively. It will also be seen that if sufficient torque may be applied to pins 80 through 83, that when the pins do not mate with deep slots 91 through 94, but engage the random depth slots, the teeth may be sheared from the disc tumbler and the lock mechanism turned where no provision is made to keep the torque at a desirable limit. Through the use of the coupling means or spring member 65, the torque applied to stem 26 is transferred to spring member 65 through the D-shaped slot formed therein and applied to flat spots 61 through 64 of hub member 55, thus the camming disc 57 does not rotate and application of further torque to stem 26 through notches 29 and collar 28 produces no movement of pins 80 through 83 carried by camming disc 57 and thus the tumbler discs are not harmed. Upon pins 80 through 83 engaging slots 91 through 94 respectively, camming disc 57 is allowed to rotate causing arms 71 and 70 to be drawn inwardly towards hub 55 and thus disengage the arms from the locking mechanism portion of the coin box.

Figure 8:
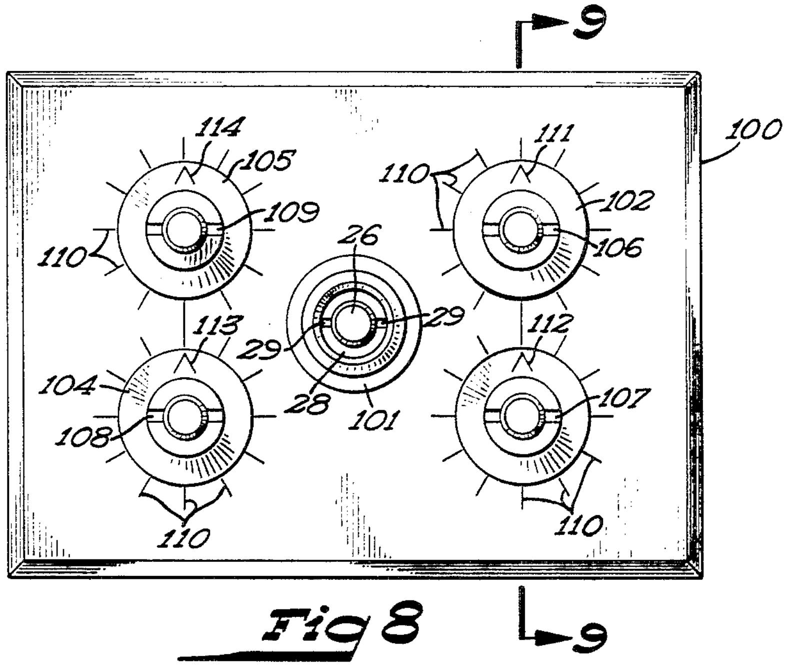
FIG. 8 is an elevation of an alternative front panel.

It may be desirable to modify the front portion of the locking mechanism and in some cases it is desirable to include a flange-type arrangement of knob which covers the opening into the front panel to thus provide further protection from jimmying or driving the shaft members through the plate and into the rearward portion of the mechanism. FIG. 8 shows a front panel 100 having a bushing 101 which is flared outwardly to extend beyond the bore in panel 100 into which it fits. A locking mechanism secured behind bushing 101 may be identical to that shown in FIG. 4 and, therefore, no attempt will be made to repeat the construction thereof. Four flanged knobs 102, 103, 104, and 105 have extended portions extending through panel 100 to communicate with the rear thereof which will be described in more detail shortly, in reference to FIG. 9. Additionally, each of the flared knob portions of knobs 102 through 105 contain four slots 106 through 109 respectively which are formed in the front face thereof in the same manner as found in FIG. 1. The slots associated with each of the knobs and the central part of the lock mechanism are adapted to receive a tool which may be used to adjust the knobs, the combination being determined through the use of indicia 110 and four pointers 111 through 114 formed on knobs 102 through 105 respectively.

Figure 9:
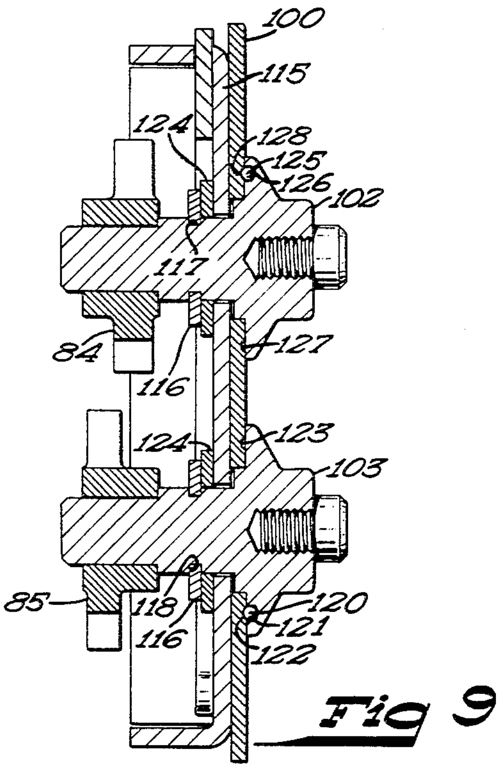
FIG. 9 is a section view of the locking discs showing the detail of an alternate indexing mechanism taken along lines 9—9 of FIG. 8.

Since it is also desirable to have an indexing mechanism associated with each of knobs 102 through 105, reference is now had to FIG. 9 wherein plate 100 is secured to another plate 115 in the same manner as plate 33 described previously. Knob 102 is held in place within a bore passing through plates 100 and 115 by suitable means such as a retaining ring 116 which engages an annular groove 117 in the extension of knob 102. In a similar manner, the rearward portion of knob extends through a bore passing through plates 115 and 100 and is held in place by suitable means such as a retaining ring 116 secured in an annular groove 118. Tumbler discs 84 and 85 are secured to a D-shaped portion of the extention of knobs 102 and 103. To provide the indexing function, a small steel ball 120 is secured in a bore 121 which is formed in the rearward edge of the flange of knob 103. A number of indentations 122 and 123 are formed in the front plate 100 corresponding to the indicia positions 110 and due to the slight spring tension effect of retaining ring 118 bearing against a washer member 124 located against plate 115, bearing 120 tends to secure the rotational movement at the indentations. In a similar manner, another ball bearings 125 rides in a bore 126 formed at the rear portion of the flange of knob 102 and the tension created by retaining ring 116 through another washer 124 produces the necessary tension to cause the ball to stop at a plurality of indentations such as indentations 127 and 128. Thus with the arrangement found in FIG. 9, it is virtually impossible to drive the shafts through the rearward portion of the locking mechanism and it is virtually impossible to pull the knob portions from the plate members to remove tumbler discs 84 and 85.

A further modification of the locking mechanism is shown in FIGS. 11 through 18 in which a front panel member 130 has a central bore 131 formed therein with four equally spaced bores 132 through 135 formed therein and concentric with center bore 131. Rotatably situated in each of bores 131 through 135, are five shafts 136 through 140 respectively, the ends of the shafts having a flat portion formed therein. Adjustment of shafts 136 through 140 is made through the use of a hand tool 141 (FIG. 12) having a shaft engaging end member 142 that cooperates with the flat portion of the shafts so that a rotational movement may be imparted thereto. Concentric with a shaft 143 engaging end member 142, is a circular member 144 which includes indicia around the periphery thereof, specifically displaying twelve positions or increments.

Figures 12, 18:
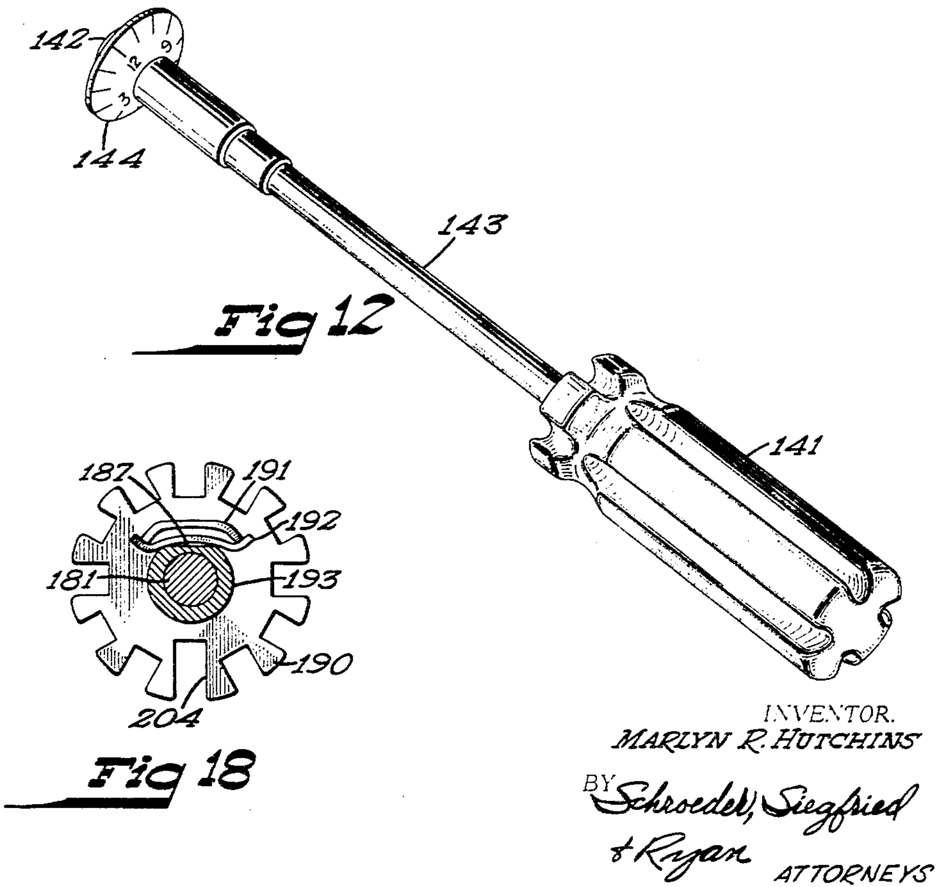
FIG. 12 is a perspective view of a hand tool used to operate the locking mechanism as found in FIG. 11.
FIG. 18 is a partial section view of a tumbler disc and coupling mechanism as seen taken along lines 18—18 of FIG. 14.
Figure 13:
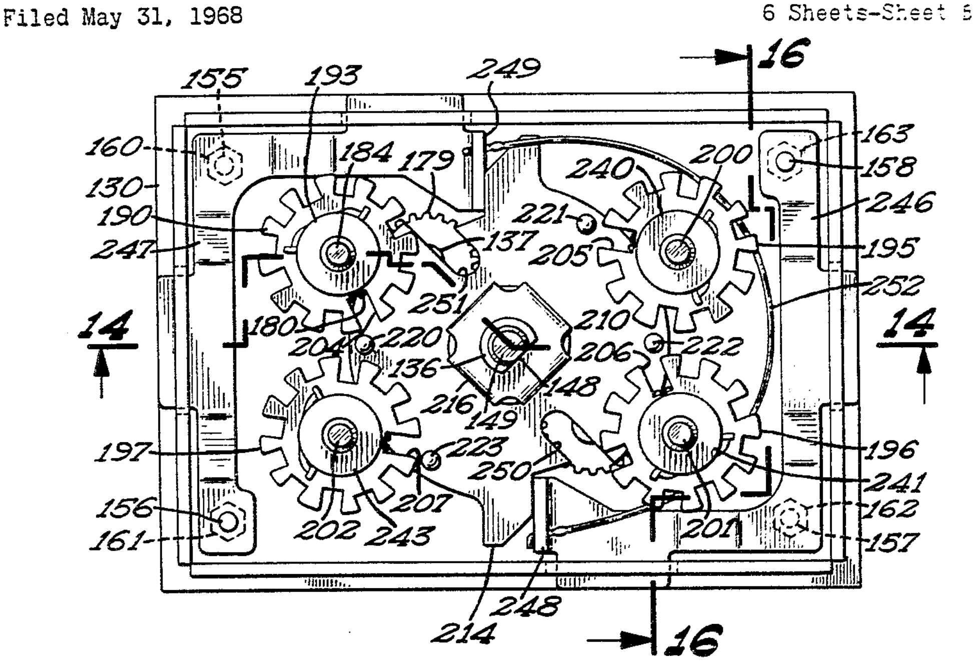
FIG. 13 is an elevation view of the rear panel of an alternate locking mechanism.
Figure 14:
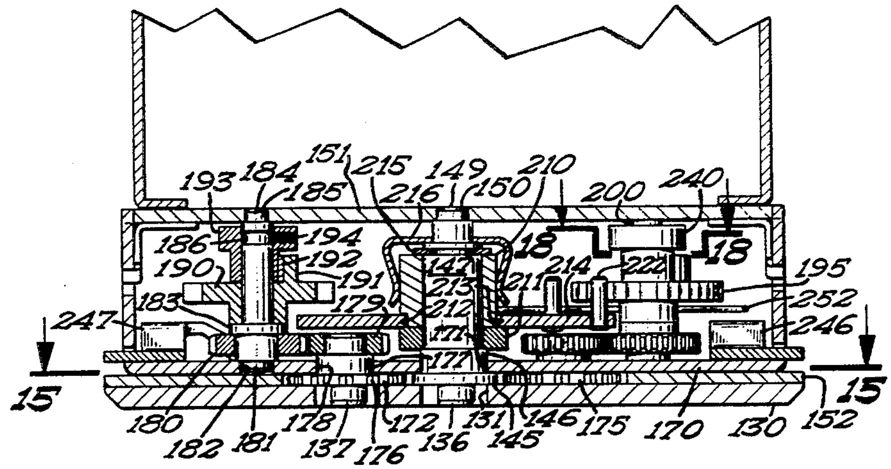
FIG. 14 is a section view of the locking mechanism showing the detail thereof as seen taken along lines 14—14 of FIG. 13.

As will be seen primarily in FIGS. 13 and 14, shaft 136 has a flanged portion 145, and a shoulder portion 146 with a reduced circular portion 147 extending rearwardly which terminates in a D-cross-sectional shaped portion with a flat spot 148 formed therein, the end of the shaft terminating in a reduced section 149 that is rotatably supported in a bore 150 formed in a back plate member 151. An intermediate plate 152 is secured to plate 130 by suitable means such as four studs 155 through 158 which are threaded to receive four nuts 160 through 163, plate 152 having four holes 164 through 167 formed therein to engage the studs. A third plate member 170 is secured to plates 130 and 152 through the same threaded studs and has its edge portions turned rearwardly to engage and secure plate 151 through suitable means such as machine screws or releasable fasteners. A bore 171 formed in the center of plate 170 supports shoulder 146 of shaft 136, and flange 145 is of a thickness slightly less than that of plate 152. Shafts 137 through 140 also have four flanges 172 through 175 formed therewith which also are secured between plates 130 and 170. Each of flanges 172 through 175 contain a plurality of notches 176 which are equal in number to the indicia on tool 141 and specifically the disc 144 which in the instant case is twelve different equally spaced radial positions. In other words, they are separated by thirty degree intervals or increments. A shoulder 177 is formed to the rear of flange 137 and rides in a bore 178. The rearwardly extending portion of shaft 137 has a D shaped cross section and a gear 179 is secured thereto. Gear 179 mates with another gear 180 which is secured to a shaft 181 through the use of another D cross-sectional portion, the forward end of shaft 181 being rotatably secured in a bore 182 formed in plate 170. A shoulder 183 is formed about shaft 181 immediately to the rear of gear 152 so that gear 180 is secured against axial movement. The rearward portion of shaft 181 terminates in a reduced section 184 which rides in a bore 185 formed in plate 151 to provide rotational movement thereto. A reduced section or annular groove 186 is formed adjacent plate 151 in shaft 181 for reasons which will be set forth in detail subsequently. A tumbler disc 190 similar to tumbler discs 84 through 87 (FIG. 2) is loosely fitted about shaft 181 for rotation thereon. On the rearwardly facing side of tumbler disc 190, is a shoulder portion 191 which has a flat leaf-spring member 192 engaging the edges thereof. A collar 193 is also fitted over shaft 181 and communicates with tumbler disc 191 and has a rearward section which contains a set screw 194 that communicates with annular groove 186. Collar 193 has a flat spot 187 formed thereon and a more detailed view of the parts cooperating therewith are shown in FIG. 18 where it will be seen that the flat spot 187 is in communication with spring member 192 which imparts motion from shaft 181 to tumbler disc 190 through the resilient coupling arrangement.

It will be recognized that the additional tumbler discs and mechanisms will be identical to that just described and, therefore, the details thereof will not be described. It will be found that three additional tumbler discs 195, 196, and 197 are supported by three shafts 200, 201, and 202 respectively. Tumbler discs 190 and 195 through 197 have four deep slots 204, 205, 206, and 207 respectively formed therein.

A hub 210 is secured for rotation over reduced cross-sectional portion 147 of shaft 136 and abuts a spacer 211 secured against shoulder 146, hub 210 having a keyway portion 212 formed adjacent spacer 211 which engages a mating slot 213 in a camming disc 214. Hub 210 is held in place by a retaining ring 215 and contains four flat sides as described previously about which a four-fingered spring coupling member 216 is in communication therewith. Coupling member 216 is keyed to shaft 136 through a D cross-sectional portion and thus rotational movement of shaft 136 imparts motion to camming disc 214. Four pins 220, 221, 222, and 223 are secured to camming disc 214 and are shown in a position with respect to the deep slots in each of the numbler discs at a position where they will engage the deep slots upon a rotational movement to unlock the locking mechanism.

Figure 15:
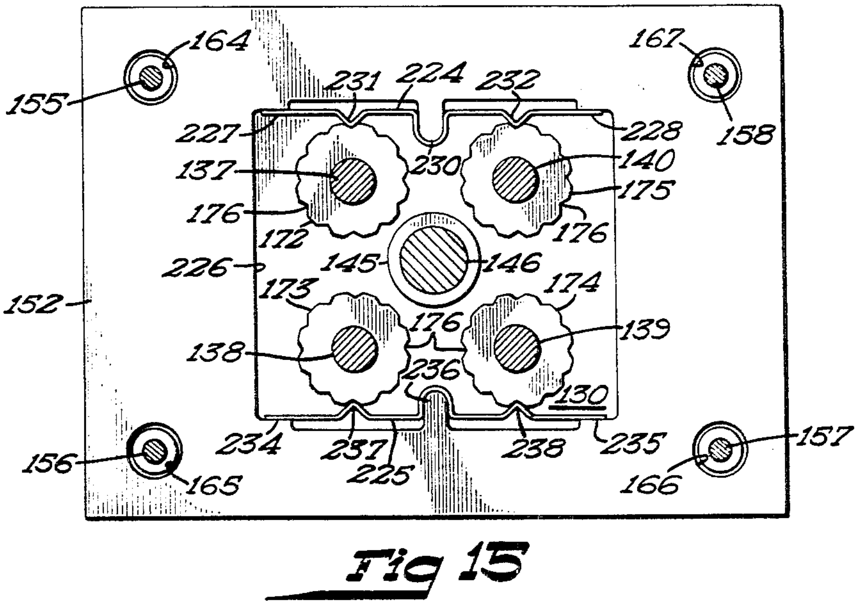
FIG. 15 is a section view of a front plate having a cutout portion showing the detail of another indexing mechanism as seen taken along lines 15—15 of FIG. 14.
Figures 16, 17:
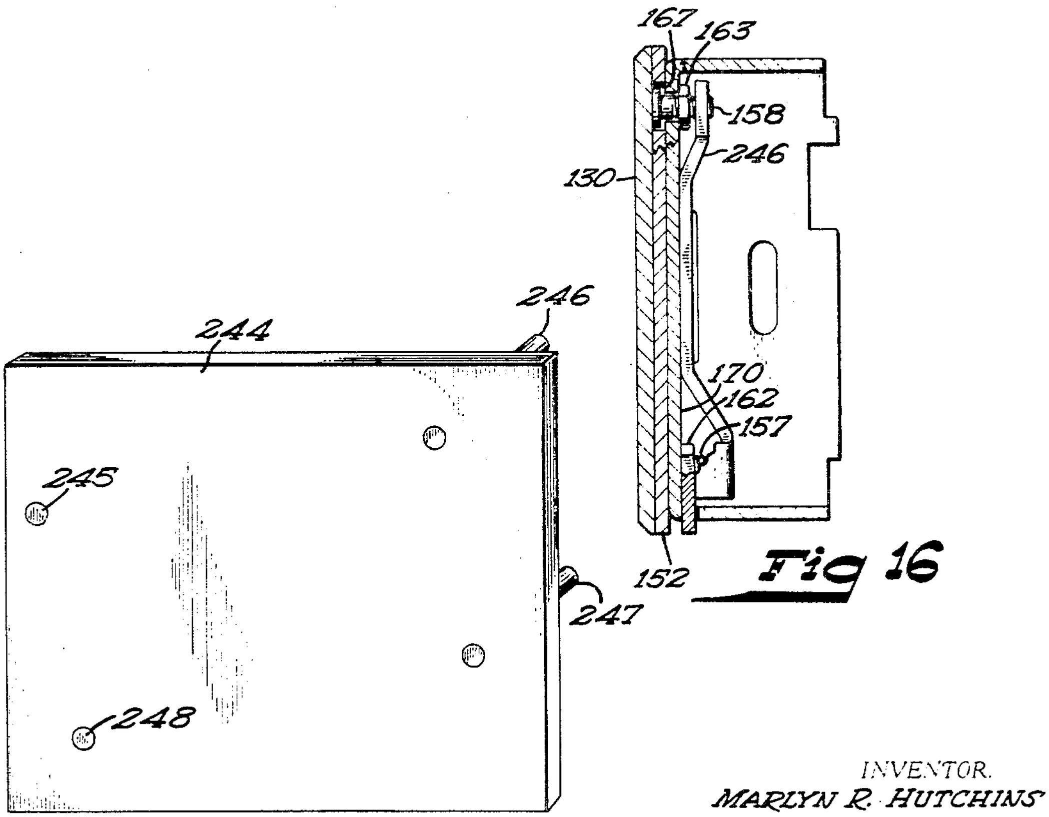
FIG. 16 is a partial section view of the locking arms of the locking mechanism as seen taken along lines 16—16 of FIG. 13.
FIG. 17 is a perspective view of a plate member having fingers extending therefrom for use in changing the locking mechanism combination.

FIG. 15 discloses an improvement in the indexing mechanism wherein a pair of spring members 224 and 225 are secured in a substantially square recess or cutout portion 226 of plate 152. Recess 226 contains a pair of shoulder members 227 and 228 which support spring member 224 at the ends thereof and an inward projecting finger 230 communicates with the center portion of spring member 224 which is bent around finger 230. Spring member 224 has a pair of detent portions 231 and 232 formed therein midway between shoulders 227, 228, and finger member 230 respectively whereby detent portions 231 and 232 engage the indentations or notches 176 formed in flanges 172 and 175 respectively. Thus as flange 172 is rotated, part of the "feel" is transferred through spring member 224 to the adjacent flange 175 so that the position of tumbler disc 190 with respect to pin 220 is somewhat obscured by communication of detent 232 with flange member 175. In a similar manner, a pair of shoulders 234 and 235 cooperate with a finger member 236 to produce tension in spring member 225 and in particular at detent portions 237 and 238 respectively. It will be noted that the shoulder members 227, 228, 234, and 235, along with the cooperating finger members 230 and 236 set the proper tension of spring members 224 and 225 with respect to flanges 172, 175, 174, and 176.

Because it is desirable to change the combination of the structure, collar 193 and three other collars, 240, 241, and 243 are releasably secured to their respective shafts 181, 200, 201, and 202. To insure that tumbler discs 190 and 195 through 197 do not rotate while the combination is being changed, a flat plate member 244 (FIG. 17) has four pins or fingers 245 through 248 secured therein which pass through holes formed in back plate 151 (not shown) to engage deep slots 204 through 207 respectively. In other words, pins 245 through 248 are placed in the deep slots as shown in FIG. 13 which lock the tumbler disc in place. The set screws such as set screw 194 are then loosened and hand tool 141 is used to set the combination for any appropriate number that the operator desires whereupon the set screw is again tightened. Thus an easy manner of changing the combination of the locking mechanism is achieved.

As a further aid to insure that the lock remains in a locked condition, a pair of substantially right-angle arms 246 and 247 are pivotally secured in place over studs 158 and 156. As will be seen in FIG. 16, arms 246 and 247 are bent at appropriate places to provide the proper clearance and emerge through the rearwardly extending portions of plate 170. Secured to the ends of arms 246 and 247 at a location greatest from studs 158 and 156 are a pair of upturned members 248 and 249 respectively. Upturned portions 248 and 249 engage a pair of edge portions 250 and 251 of camming disc 214 when it is rotated to draw arms 246 and 247 inwardly towards hub 210. A spring member 252 in the form of a wire spring is secured to upstanding arm portions 248 and 249 to urge arms 246 and 247 away from hub 210 towards a locked condition. Thus spring 252 keeps arms 246 and 247 in a locked condition at all times and until cam 214 is rotated where edges 250 and 251 pickup the upturned portions and cam them towards hub 210.

The present application as thus disclosed is directed to a mechanism for aiding and preventing the burglarization of coin boxes for coin-operated appliances. The front panel members such as plates 100 and 130 are formed of a case-hardened steel as are the shafts which are exposed to the front of the panel. It has been found that the tumbler discs are best formed of metal because in some instances, heat has been applied to the front panel in such quantities as to melt certain plastic materials which may be used. Primarily, through the use of the spring-loaded coupling members for each of the tumbler discs and the locking mechanism itself, it will be found that it is virtually impossible to destroy the inner construction of the locking mechanism through the use of "brute force." Furthermore, through the use of a plate such as plate 244 with the appropriate fingers extending into the deep slots, it is very convenient to change the combination at will anytime the locking mechanism is removed from the coin box. By the use of the indexing mechanism, it will also be found that it is much more difficult to determine the "feel" of the tumbler discs and pins as they engage the random depth slots of the tumbler discs so that it is extremely difficult to "pick" the combination of the lock. Through the use of the spring mechanism 252 acting upon arms 246 and 247, the lock may be virtually destroyed or jammed and yet the mechanism will not open, and while the would-be burglar may almost completely destroy the lock, it is so constructed that it will still remain locked in the coin box.

It will, of course, be understood that various changes may be made in the form, details, arrangement and proportions of the parts without departing from the scope of the invention which consists of the matter shown and described herein.

What is claimed is:

1. An improved locking mechanism for a coin box having a lock portion secured thereto in combinaiton with a plate means having a plurality of bores formed therein, one of which is substantially centrally located from all others, having arm means movably secured to the rear of the plate means and adapted to move away from and towards the substantially centrally located bore and cooperate with the lock portion of the coin box with a plurality of rotatable disc tumbler means secured to the rear of the plate means and extending to the rear thereof cooperating with the plurality of bores other than the bore substantially centrally located and having a predetermined number of rotational rest positions, and including pin means for engaging the cooperating plurality of disc tumbler means, wherein the improvement comprises:

(a) stem means rotatably secured to said plate means and extending axially to the front and rear thereof through the substantially centrally located bore for operable engagement from the front of the plate means;

(b) hub means having a bore encircling said stem means and having motion imparting means cooperatively engaging the arm means and the pin means for imparting motion thereto, the pin means engaging the rotatable disc tumbler means;

(c) and resilient coupling means having a predetermined torque limit coupling said stem means to said hub means during normal application of torque and allowing said stem means to rotate with respect to said hub means when said predetermined torque limit is exceeded;

(d) at least one flat portion formed on the periphery of said hub means forming a gripping surface for a cooperating member;

(e) and said resilient coupling means including a spring member having a first element secured to said stem means and at least one dependent element engaging at least one flat portion of said hub means, said dependent member slipping from engagemment with said flat portion upon applying a predetermined torque to said stem means.

2. The invention as set forth in claim 1 wherein said hub means and said resilient coupling means each include:

(f) four flat surfaces radially disposed substantially equal angles from each other around the perimeter thereof, said surfaces mating with each other in coupling relationship.

3. The invention as set forth in claim 1 including:

(g) bushing means secured to the plate means and extending to the front and rear thereof concentrically through the substantially centrally located bore, said stem means being rotatably secured in said bushing means.

4. The invention as set forth in claim 1 including:

(h) a camming disc having a central opening formed therein including a keyway portion and having the pin means secured thereto, said hub means also including a mating portion engaging said keyway portion to impart a concentric rotation thereto when said hub means is rotated.

5. The invention as set forth in claim 1 including:

(i) first gear means rotatably mounted in the plurality of bores other than the bore substantially centrally located and extending to the front and rear of the plate means;

(j) and second gear means fixedly secured to the rotatable disc tumbler means and meshing with said first gear means in driven relationship causing rotation of the disc tumbler means.

6. The invention as set forth in claim 5 including:

(k) hand tool means adapted to engage and rotate separately said first gear means and said stem means from the front of the plate means;

(l) and indicia means including first indicia secured to said hand tool means in circular form and second indicia secured to the plate means adjacent at least the plurality of bores other than the bore substantially centrally located in the plate means.

7. The invention as set forth in claim 1 wherein said rotatable disc tumbler means include:

(m) driving members rotatably mounted and extending to the front and rear of the plate means through the plurality of bores other than the bore substantially centrally located;

(n) driven members mounted for rotation by said driving members, said driven members including discs having a predetermined number of radially extending random depth slots formed around the edges thereof, at least one slot of which is deeper than all others, said slots engaging the pin means;

(o) and second resilient coupling means having a predetermined torque limit coupling said driven members to said driving members during normal application of torque and allowing said members to rotate with respect to each other when said predetermined torque limit is exceeded.

8. The invention as set forth in claim 7 including:

(p) a slot-engaging means having a plurality of finger members equal in number to said plurality of slots deeper than all others, said fingers disposed to engage all of said deeper slots simultaneously at rotational positions of said driving members representative of a predetermined setting;

(q) and releasable securing means releasably securing said second resilient coupling means to one of said driving and driven members.

9. The invention as set forth in claim 8 including:

(r) a back plate spatially disposed behind the plate means and connected thereto, said back plate rotatably supporting said stem means and said driven members and having a plurality of holes formed therein for receiving said finger members of said slot engaging means.

10. The invention as set forth in claim 1 including:

(s) indexing means including flange members with peripheral notches formed therein equal in number to the predetermined number of rotational rest positions of said disc tumbler means secured to the disc tumblers and having spring members with detents formed therein operatively engaging at least two of said flange members simultaneously to cooperate with said notches formed therein, said spring members being adapted to be secured to the plate means.

11. The invention as set forth in claim 1 including:

(t) indexing means having a plurality of first elements thereof formed in the plate means and a plurality of second elements formed in the plurality of rotatable disc tumbler means, said first and second elements cooperating to arrest rotation of said rotatable means at predetermined angular positions with respect to the plate means.

12. The invention as set forth in claim 11 wherein one of said elements is in the form of indentations formed therein and the other of said elements is in the form of a detent operatively cooperating with said indentations.

13. The invention as set forth in claim 1 wherein the forwardly facing ends of said stem means and the plurality of circular shaped rotatable means include:

(u) at least one notched portion formed in the outer periphery thereof constructed and arranged to receive a tool having a dog-extending member, the ends of said stem means and the rotatable means extending forwardly no further than the front surface of the plate means.

14. The invention as set forth in claim 13 wherein the plate means and rotatable means include:

(v) at least a pair of plates secured to each other in flat relationship having a recess formed in at least one of said plates disposed to encompass each of the bores located away from the substantially centrally located bore;

(w) and a circular flange member fixedly secured to the rotatable means and rotatably secured in said recess preventing axial movement with respect to said pair of plates.

15. The invention as set forth in claim 1 including:

(x) spring bias means connected to the arm means urging the arm means away from the substantially centrally located bore in the plate means towards a locked condition.

References Cited

UNITED STATES PATENTS

| | | | |
|---|---|---|---|
| 1,565,754 | 12/1925 | Orth | 64—29 |
| 1,566,829 | 12/1925 | Clark | 70—304 |
| 2,027,186 | 1/1936 | Lowe | 70—369 |
| 2,063,708 | 12/1936 | Swilens | 70—134 |
| 3,416,337 | 12/1968 | Hutchins | 70—284 |

MARVIN L. CHAMPION, Primary Examiner

ROBERT L. WOLFE, Assistant Examiner

U.S. Cl. X.R.

70—317, 328, 422